United States Patent
Decoux et al.

(10) Patent No.: US 9,224,028 B2
(45) Date of Patent: Dec. 29, 2015

(54) PATTERN FOR CODING A NUMERICAL INFORMATION ITEM ON A SURFACE AND MARKING AND READING METHODS

(75) Inventors: Eric Decoux, Vevey (CH); Dave Vuistiner, Lausanne (CH)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 14/354,720

(22) PCT Filed: Nov. 15, 2011

(86) PCT No.: PCT/EP2011/070186
§ 371 (c)(1),
(2), (4) Date: Apr. 28, 2014

(87) PCT Pub. No.: WO2013/071960
PCT Pub. Date: May 23, 2013

(65) Prior Publication Data
US 2014/0284385 A1 Sep. 25, 2014

(51) Int. Cl.
*G06K 7/14* (2006.01)
*G06K 19/06* (2006.01)

(52) U.S. Cl.
CPC ............ *G06K 7/1447* (2013.01); *G06K 7/1417* (2013.01); *G06K 19/06037* (2013.01); *G06K 19/06046* (2013.01); *G06K 19/06056* (2013.01); *G06K 19/06103* (2013.01)

(58) Field of Classification Search
CPC .......... G06K 7/1447; G06K 19/06046; G06K 19/06056; G06K 19/06103; G06K 7/1417; G06K 19/06037
See application file for complete search history.

(56) References Cited

U.S. PATENT DOCUMENTS

| | | |
|---|---|---|
| 5,721,788 A | 2/1998 | Powell et al. |
| 5,809,160 A | 9/1998 | Powell et al. |
| 5,930,377 A | 7/1999 | Powell et al. |
| 6,072,888 A | 6/2000 | Powell et al. |
| 6,137,892 A | 10/2000 | Powell et al. |
| 6,307,950 B1 | 10/2001 | Powell et al. |
| 6,317,505 B1 | 11/2001 | Powell et al. |

(Continued)

FOREIGN PATENT DOCUMENTS

| | | |
|---|---|---|
| FR | 2 882 173 | 8/2006 |
| RU | 2345412 C1 | 1/2009 |

(Continued)

OTHER PUBLICATIONS

International Search Report Issued Jan. 2, 2013 in PCT/EP11/070186 Filed Nov. 15, 2011.

(Continued)

*Primary Examiner* — Kristy A Haupt
(74) *Attorney, Agent, or Firm* — Oblon, McClelland, Maier & Neustadt, L.L.P.

(57) ABSTRACT

A pattern for coding numerical a information item on a surface, including a specific arrangement of a plurality of symbols belonging to a set of symbols (ENS1), and each symbol in the arrangement being intended for the coding of a portion of said numerical information item, wherein each symbol includes at least one differential pair of elements (E1, E2) positioned in a specific way, each element being characterized by a parameter, the parameter of the first element of each differential pair having a first value and the parameter of the second element of each differential pair having a second value different from the first value.

16 Claims, 5 Drawing Sheets

(56) References Cited

U.S. PATENT DOCUMENTS

| | | |
|---|---|---|
| 6,459,803 B1 | 10/2002 | Powell et al. |
| 2002/0037090 A1 | 3/2002 | Powell et al. |
| 2002/0044673 A1 | 4/2002 | Powell et al. |
| 2002/0061119 A1 | 5/2002 | Powell et al. |
| 2002/0181740 A1 | 12/2002 | Powell et al. |
| 2003/0026450 A1 | 2/2003 | Powell et al. |
| 2005/0117776 A1 | 6/2005 | Powell et al. |
| 2005/0147275 A1 | 7/2005 | Powell et al. |
| 2005/0147276 A1 | 7/2005 | Powell et al. |
| 2005/0199721 A1* | 9/2005 | Chang et al. ............... 235/462.1 |
| 2007/0019837 A1 | 1/2007 | Powell et al. |
| 2007/0086619 A1 | 4/2007 | Powell et al. |
| 2007/0114285 A1 | 5/2007 | Chang et al. |
| 2008/0179406 A1 | 7/2008 | Rivaillier |
| 2008/0298703 A1 | 12/2008 | Powell et al. |
| 2010/0220934 A1 | 9/2010 | Powell et al. |

FOREIGN PATENT DOCUMENTS

| | | |
|---|---|---|
| RU | 96269 U1 | 7/2010 |
| WO | 2012 037985 | 3/2012 |

OTHER PUBLICATIONS

Office Action issued Dec. 17, 2014 in Mexican Patent Application No. MX/a/2013/010783 (submitting English language translation only).

International Preliminary Report on Patentability issued May 30, 2014 in PCT/EP2011/070186.

Office Action issued Jun. 8, 2015 in Mexican Patent Application No. MX/a/2013/010783 (submitting English language translation only).

Office Action dated Aug. 19, 2015 in AP 2011 013490, filed Nov. 15, 2011 (with English translation).

Office Action (with English translation), issued Aug. 28, 2015 in corresponding MX Patent Application MX/a/2013/010783 filed Nov. 15, 2011.

* cited by examiner

PATTERN FOR CODING A NUMERICAL INFORMATION ITEM ON A SURFACE AND MARKING AND READING METHODS

The invention relates to the coding of numerical information on a surface by means of one or more patterns, in particular two-dimensional patterns, in order to identify articles or security devices.

The invention also relates to the articles or security devices comprising such patterns, and the methods for marking and reading these patterns on such articles or security devices.

Currently, articles and security devices can be identified by a mark or a logo inscribed on a package of the article or on the article itself. These inscriptions are visible and enable the article to be identified by all users.

It is also possible to use other visible identifiers which contain encrypted information so that the content of the identifier cannot be recognized by all users. There are, for example, one-dimensional identifiers of the barcode type or two-dimensional identifiers of the data matrix type, usually printed on a surface, and which are the most widely used.

The barcodes represent information using a pattern consisting of bars with different thicknesses and spacings. However, these patterns can easily be decrypted.

Moreover, the identifiers of the "data matrix" type use white and black pixels forming an identification pattern and which are arranged within the pattern in a rectangular or quadratic form. Such a data matrix is identified by two adjacent solid areas in the form of an "L", which as a whole is called "identifying pattern", and two edges formed by alternating white and black pixels, called "clock". The "L" shaped pattern is used to locate and orient the identification pattern and the so-called "clock" pattern is used to count the number of columns and rows in the identification pattern. Furthermore, the "data matrix" also requires a so-called "blank" area, sometimes called "quiet zone", for the identifying pattern to be detected. This so-called "blank" area is used to clearly isolate the identifying pattern from any other element of the article with which it might be confused.

However, these identifiers, visible to the user, notably through their identifying pattern and their detection area, must be marked in a chosen place on the article in order not to detract from its general appearance. Moreover, the identifying pattern is a known and constant pattern regardless of the article to be identified. This identifying pattern does not contain any information and is used only to detect the identification pattern.

Furthermore, these data matrices, despite being provided with error correction mechanisms, are not sufficiently robust because they depend on the substrate on which they are applied. In practice, depending on the unevennesses of the substrate, the latter may degrade the pattern when it is marked on the article. The robustness of such a pattern also depends on the print quality, because a printing defect, for example an ink which spreads or an absence of printing of a pixel, may greatly affect the pattern. In some cases, a data matrix with a dimension of 16 pixels by 16 pixels may also be rendered illegible by the destruction of more than six pixels.

According to the present invention, there is proposed a pattern for coding a numerical information item which enhances the robustness of the identification of conventional articles or security devices.

There is also proposed a pattern for coding a numerical information item which is invisible to the user while being detectable by a suitable detection system.

Furthermore, there is a proposed a pattern for coding a numerical information item that can be printed and read even when the print quality is poor and also when the resolution used is fine, for example at least 300 dots per inch (DPI), preferably between 300 DPI and 600 DPI.

According to one aspect of the invention, there is proposed a pattern for coding a numerical information item on a surface, comprising a specific arrangement of a plurality of symbols each belonging to a set of symbols, each symbol in the arrangement being intended for the coding of a portion of said numerical information item, each symbol consisting of at least one differential pair of elements positioned in a specific way, each element being characterized by a parameter, the parameter of the first element of each differential pair having a first value and the parameter of the second element of each differential pair having a second value different from the first value.

The symbols of the set of symbols may all be different.

As a variant, the symbols of the set of symbols are identical, in other words, the set of symbols comprises only one symbol comprising at least one differential pair of elements having different parameter values.

In the present description a differential pair should be understood to be a pair of elements in which the first element can be characterized by a first value of a parameter and the second element can be characterized by a second value of this parameter, different from the first value of the parameter. This parameter value difference may be any detectable difference, even if this difference cannot be detected by the naked eye.

The values of the parameters characterizing two elements of a differential pair may be respectively greater than and less than a first reference value and/or the difference between the two values may be greater than a second reference value.

An element should be understood to be a surface portion marked so as to assign it a value of a parameter capable of characterizing this surface portion by making its detection possible relative to any adjacent or immediately adjacent surface portion. By way of nonlimiting example, the elements may be surface portions in the form of spots or localized reliefs, which may have an approximately circular contour. Obviously, other forms are possible. The elements may be produced by printing an ink on the surface, by calendaring, stamping or any other appropriate method.

The symbols may belong to a set of symbols, and they may correspond to a specific positioning of one or more differential pairs. In a symbol, the elements of a differential pair have a fixed relative position, but the parameter values of these elements are different.

Furthermore, in the present description, a specific arrangement of symbols comprising differential pairs is called a reference pattern.

Each symbol of the set of symbols may have at least one first representation and one second representation different from the first representation, the values of the parameters of the elements of at least one differential pair of the symbol both being different between the first representation and the second representation.

Said at least two representations of a symbol having a single differential pair are, for example, obtained by an arrangement of a differential pair in the configuration of the symbol and different parameter values for the two elements between the two representations.

Thus, since each symbol can be represented in its several representations, a same arrangement of symbols, or "pattern", can be represented in a number of different ways. Furthermore, the increase in the number of symbols, or the increase in the number of differential pairs of the symbols, makes it possible to considerably increase the number of marking possibilities for one and the same arrangement.

It will be noted that the coding pattern is illegible to a user who does not previously know the symbols used and their representations, and the arrangement of these symbols. Even if a user could detect the elements marked on a surface, not knowing the symbols nor their "pattern" arrangement, it would be very difficult, or even impossible, for him or her to determine the symbols marked according to different representations. It is therefore almost impossible to retrieve the numerical information coded by the coding pattern without knowing the symbols, the representations of the symbols, and their arrangement.

Furthermore, the coding pattern of the invention does not require the use of a particular additional identifier of "L" shaped pattern, clock or even quiet zone type for its subsequent reading. Compared to a data matrix pattern, the coding pattern according to the invention does not include any specific detection area for the identification of the coding pattern. It is the specific arrangement of the symbols that enables it to be identified.

It will be noted that the symbols of the coding pattern of the present invention are different from the symbols of a data matrix: the symbols of a data matrix are in fact pixels, for example black or white, and not differential pairs of elements.

In one embodiment, the positioning of the first element and of the second element of a differential pair of elements in a representation of a symbol is the reverse of the positioning of the first element and of the second element of the same differential pair of the same symbol in another representation.

In other words, the difference in the value of said parameter between the first element and the second element of said differential pair of the symbol in a representation may be positive, and the difference in the value of said parameter between the first element and the second element of said differential pair of the symbol in another representation may be negative. The same may apply for all or some of the other differential symbol pairs.

A differential pair of a symbol will thus comprise, in one representation, a first element having a high level (for said parameter), and a second element having a low level. In another representation of the symbol, it is the first element which has a low level, and the second which has a high level. It will be noted that, in a preferred example, the average value of the parameter within the elements of the differential pair will be the same in both representations.

Obviously, for symbols comprising a number of differential pairs, one differential pair may be unchanged between two different representations if at least one other differential pair of the symbol is modified between these two representations.

It will be noted that a set of symbols in which the parameter of the elements of the differential pairs can have only two values (or values in the vicinity of two different values) makes it possible to form a pattern having a uniform appearance with respect to said parameter. The detection of the symbols is thus made all the more difficult, the symbols being difficult to discern.

Furthermore, the difference between the values of the parameters of the two elements of a differential pair may be greater than a first threshold (for example said second reference value) and less than a second threshold. Thus, the differential pairs of a representation of a symbol comprise two elements each having a value of a parameter, and the difference in value between the two elements is greater than a first threshold and less than a second threshold.

As a variant, the values of the parameters of the two elements of a differential pair of elements are respectively greater than and less than the average value of said parameter within differential pairs neighbouring said differential pair.

Thus, when a differential pair is detected, it is possible to calculate the average value of the parameter in an area corresponding to the vicinity of the differential pair comprising, for example, a number of differential pairs or a number of marked elements, then the value of the parameter of each element of the pair concerned is compared to said average value. It is thus possible to check that the pair is in fact a differential pair, and then check which representation it corresponds to.

The elements can be chosen from the group comprising spots imprints and reliefs, and said parameter may be included in the group formed by the colorimetric components, the depth, the height, the electromagnetic absorption, the magnetic properties (for example the magnetic permeability or susceptibility), the shape, the quantity of ink used, the electrical conductivity, the luminescence (fluorescence and/or phosphorescence).

The colorimetric components may be the hue, the saturation, the lightness, known to those skilled in the art by the acronym "HSL" (Hue Saturation Lightness). Said parameter may be one of these components, for example the lightness for two elements of a black and white or even grey and dark grey differential pair. It is also possible to use another system, for example the red, green, blue system, well known to those skilled in the art by the acronym RGB.

The portion of said numerical information of the symbol may be a binary value defined by the representation of the symbol.

Thus, a differential pair of a symbol may correspond to one or more information bits whose value is defined, for example, according to the sign and/or the amplitude of the difference between the value of the parameter of the first element of the differential pair and the value of the parameter of the second element of the differential pair. It is also possible to assign a number of bits to a single differential pair of elements, for example by using a number of parameters. Moreover, the amplitude of the difference may be a numerical value comprising a number of bits.

The symbols of the pattern may define a binary value corresponding to said numerical information coded by the pattern.

It is also possible to define an order of reading of the symbols arranged in a pattern to restore all the bits of the value coded by the pattern.

The pattern may be marked within an image comprising pixels, said elements being modified pixels of the image and said parameter being at least one colorimetric pixel component.

According to another aspect, there is proposed an article or security device comprising at least one pattern as defined above.

The article or security device may comprise a number of identical and/or different patterns.

By virtue of the repetition of the coding pattern, the robustness with regard to its subsequent identification is improved. Because of the repetition of the pattern, the destruction or the degradation of a pattern does not prevent detection of the presence of at least one other pattern from all the patterns marked on the article. By using patterns that have a uniform appearance, it is possible to mark a number of patterns without damaging the visual appearance of the article or of the security device.

The article or security device may be chosen from a label, a package, a cartridge, a container containing foodstuffs, nutraceutical products, pharmaceutical products or drinks, a bank slip, a credit card, a stamp, a revenue stamp, a tamper indicator, a secure document, a passport, an identity card, a driving licence, an access card, a transport ticket, an admission ticket, a coupon, a printing form, a reflecting film, aluminium foil or a commercial article.

The article or security device may comprise at least one pattern marked within an image or a logo or a coded representation of another numerical information item chosen from the group formed by one-dimensional, two-dimensional or three-dimensional barcodes, scatterplots, networks of lines, data matrices.

Thus, it is possible to code information in a representation coding another information item. As a nonlimiting example, it is possible to mark a pattern in the bars of a barcode, by printing a pattern according to the invention with a resolution that is small enough to mark the elements having a different parameter value within a barcode bar.

It will also be noted that the surface marked may be concealed under a layer of another material, for example under a layer of a plastic and/or polymeric film. It will thus be possible to read the pattern easily through such a layer of a plastic and/or polymeric film.

By marking a large number of small patterns, it would be possible to crease the marked surface (and/or a layer positioned on top) or to greatly alter it while retaining the possibility of reading at least one marked pattern. By contrast, the barcodes or data matrices used hitherto are generally marked just once on an article, and an alteration makes them illegible.

According to another aspect, there is proposed a method for marking a pattern for coding a numerical information item on a surface, characterized in that it comprises the following steps:
  a specific arrangement is defined for a plurality of symbols belonging to a set of symbols (ENS1), each symbol in the arrangement being intended for the coding of a portion of numerical information, each symbol consisting of at least one differential pair of elements positioned in a specific way, each element being characterized by a parameter, the parameter of the first element having a first value and the parameter of the second element having a second value different from the first value,
  a pattern for coding said numerical information item is created by means of the specific arrangement of a plurality of symbols,
  a surface is provided,
  a plurality of elements (E1, E2) is marked on said surface, the elements each being characterized by said parameter,
  the step for marking the plurality of elements is carried out in such a way that certain marked elements form the numerical information item coding pattern.

The symbols of the set of symbols may be all different.

As a variant, the symbols of the set of symbols may all be identical, the set of symbols then comprising a single symbol.

The values of the parameters of two elements of a differential pair may be respectively greater than and less than a first reference value and/or the difference between the two values is greater than a second reference value.

For each symbol of the set of symbols, at least one first representation and one second representation different from the first representation may be defined, the values of the parameters of the elements of at least one differential pair of the symbol both being different between the first representation and the second representation.

The positioning of the first element and of the second element of a differential pair of elements in a representation of a symbol is the reverse of the positioning of the first element and of the second element of the same differential pair of the same symbol in another representation.

The difference between the values of the parameters of the two elements of a differential pair may be greater than a threshold.

As a variant, the values of the parameters of the two elements of a differential pair of elements are respectively greater than and less than the average value of said parameter within differential pairs neighbouring said pair.

The marking of the elements may comprise a printing or an etching or a deposition or a stamping or an application of a laser beam, and said parameter may be included in the group formed by the colorimetric components, the depth, the height, the electromagnetic absorption, the magnetic properties, the shape, the quantity of ink used, the electrical conductivity, the luminescence (fluorescence and/or phosphorescence).

The portion of said numerical information item of the symbol may be defined as being a binary value defined by the representation of the symbol.

The symbols of the pattern may define a binary value corresponding to said numerical information item coded by the pattern.

The pattern may be marked within an image comprising pixels, said elements being pixels of the image and said parameter being at least one colorimetric pixel component.

The method may also comprise, prior to the step for marking the elements on said surface, a creation of said differential pairs of the symbols of the pattern comprising a measurement of at least one colorimetric component of two pixels of the image intended to form a differential pair of a symbol, a calculation of the difference in the measurement of the two pixels, a modification of the value of said at least one colorimetric component of the two pixels if the difference is less than a threshold.

The modification of the value of said at least one colorimetric component of the two pixels comprises an increase by an additional value of said value of a first pixel of the differential pair and a reduction by said additional value of a second pixel of the differential pair. Thus, the value of one pixel is increased by as much as that of the other pixel of the differential pair is reduced. The modification is therefore made without changing the average value for the two pixels of the differential pair, and the image is preserved.

Obviously, the image may be a numerical image before being marked in order to facilitate the modifications of the values of the pixels.

A surface of an article or of a security device may be marked.

A number of identical and/or different patterns may be marked on the article or security device.

The article or security device may be chosen from a label, a package, a cartridge, a container containing foodstuffs, nutraceutical products, pharmaceutical products or drinks, a bank slip, a credit card, a stamp, a revenue stamp, a tamper indicator, a secure document, a passport, an identity card, a driving license, an access card, a transport ticket, an admission ticket, a coupon, a printing form, a reflecting film, aluminium foil and a commercial article.

It is possible to mark, on the article or security device, at least one pattern within an image or a logo, or a coded representation of another numerical information item chosen from the group formed by one-dimensional, two-dimensional or three-dimensional barcodes, scatterplots, networks of lines, data matrices.

According to yet another aspect, there is proposed a method for reading a numerical information item coded in a pattern marked on a surface comprising marked elements each characterized by a parameter, said method comprising the following steps:

a specific arrangement of a plurality of symbols belonging to a set of symbols is stored, each symbol in the arrangement being intended for the coding of a portion of said numerical information, each symbol consisting of at least one differential pair of elements positioned in a specific way, the parameter of the first element of each differential pair having a first value and the parameter of the second element of each differential pair having a second value different from the first value, an image of the elements of an area of said surface containing at least part of said pattern is captured, the elements forming said pattern are identified by means of said stored arrangement, said symbols of the pattern are identified by means of said stored arrangement.

The symbols of the set of symbols may all be different.

As a variant, the symbols of the set of symbols may all be identical.

The term "image" should be understood to mean a two-dimensional representation of at least the value of the parameter within said area.

It will be noted that this reading method is different from an optical character recognition (OCR) method in that the symbols, according to one aspect of the invention, are pairs of elements having a different parameter value, that is to say differential pairs. The symbols of a so-called "OCR" method do not comprise differential pairs of elements but a single form, that of the character to be recognized.

The identification of the symbols may also comprise a comparison of the value of the parameters of two marked elements of a differential pair to a first reference value and/or a comparison of the difference between the two values and a reference value.

Each symbol of the stored arrangement may have at least one first representation and one second representation different from the first representation, the values of the parameters of the elements both being different between the first representation and the second representation.

The positioning of the first element and of the second element of a differential pair of elements in a representation of a symbol may be the reverse of the positioning of the first element and of the second element of the same differential pair of the same symbol in another representation.

The identification of the symbols may also comprise a comparison to a threshold of the difference between the values of the parameters of the two elements of a differential pair.

As a variant, the identification of the symbols may also comprise a measurement of the average value of said parameter within differential pairs neighbouring a differential pair of elements and this average value is compared to the value of the parameter of each element of said differential pair.

Said parameter may be included in the group formed by the colorimetric components, the depth, the height, the electromagnetic absorption, the magnetic properties, the shape, the quantity of ink used, the electrical conductivity, the luminescence (fluorescence and/or phosphorescence), and said captured image may comprise a representation of the value of this parameter on said area.

The portion of said numerical information item may be a binary value defined by the representation of the symbol.

The symbols of the pattern may define a binary value corresponding to said numerical information item coded by the pattern.

The pattern may be marked within an image comprising pixels, said elements being pixels of the image and said parameter being at least one colorimetric pixel component.

Said marked surface may be a surface of an article or security device and the marked surface may be a part or all of the surface of the security article or of the security device.

A number of identical and/or different patterns may be marked on the article or security device.

The article or security device may be included in the group formed by a label, a package, a cartridge, a container containing foodstuffs, nutraceutical products, pharmaceutical products or drinks, a bank slip, a credit card, a stamp, a revenue stamp, a tamper indicator, a secure document, a passport, an identity card, a driving license, an access card, a transport ticket, an admission ticket, a coupon, a printing form, a reflecting film, aluminium foil and a commercial article.

The pattern may be marked on the article or security device within an image or a logo, or a coded representation of another numerical information item chosen from the group formed by one-dimensional, two-dimensional or three-dimensional barcodes, scatterplots, networks of lines, data matrices.

According to yet another aspect, there is proposed a system suitable for implementing said marking method. This system may comprise processing means suitable for defining said specific arrangement and said coding pattern, for example a computer device, a device comprising a microprocessor and/or logic circuits and means for marking elements characterized by said parameter on a surface.

According to another aspect, there is proposed a system suitable for implementing said reading method. This system may comprise a mobile telephone equipped with a camera, a tablet equipped with a camera, a portable or fixed camera, a portable or fixed scanner. As a general rule, this system may comprise means for storing said specific arrangement, a reading device having a reading window whose dimensions are at least equal to those of the marked pattern, element identification means, means for identifying symbols.

According to another aspect, there is proposed a use of said pattern for the authentication of an article or security device.

Other advantages and features of the invention will become apparent from studying the detailed description of a few exemplary implementations and embodiments, which are in no way limiting, and the appended drawings, in which.

In the figures, the same references correspond to the same elements. The elements of the figures are not drawn to scale.

Figure 1:
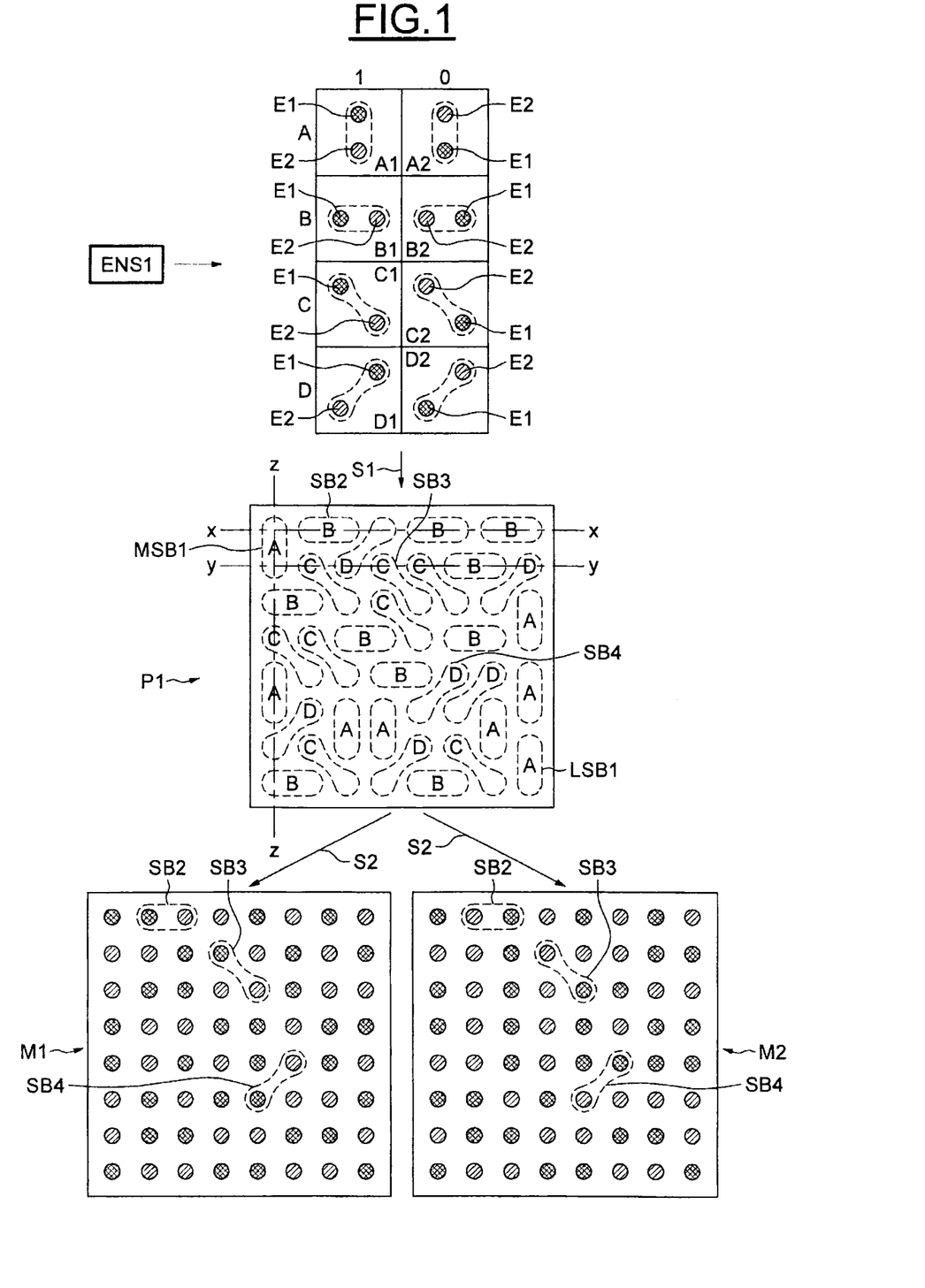
FIG. 1 schematically illustrates an implementation of a creation of a pattern according to the invention, FIG. 2 schematically illustrates another implementation of a creation of a pattern according to the invention, FIG. 3 schematically illustrates an implementation of a method for marking the pattern of FIG. 1 on an article or security device, FIG. 4 schematically illustrates an implementation of a method for reading an identification pattern applied to an article, FIG. 5 schematically illustrates an embodiment of a pattern according to the invention.

FIG. 1 schematically shows an implementation of a creation S1 of an arrangement P1 of symbols according to the invention.

The symbols of the arrangement P1, denoted A, B, C and D belong to a set of symbols ENS1.

The symbols A, B, C and D, four of them in this example (but there could obviously be more), comprise a differential pair of elements referenced E1 and E2 in the figure. The elements E1 and E2 are represented in the figure, by way of example and in order to give a better understanding of the invention through cross-ruled or shaded spots illustrating different values of a parameter, the parameter being, for example, the grey level. The cross-ruled spots E1 have, in the example illustrated, a parameter value greater than that of the shaded spots E2. In other words, the spots forming the elements E1 are darker than those forming the elements E2. The elements E1 and E2 thus form a differential pair according to the invention.

The respective position of the elements of a differential pair E1 and E2 defines the symbol (A to D).

In the example illustrated, the elements E1 and E2 of a differential pair are separated from one another by the approximate size of an element. Other positionings are possible. The two elements of a differential pair of a symbol may be close, and even in contact, or, on the other hand, further apart. The shape of the elements, in this case circular spot form, may also be different, for example rectangular, triangular or elliptical, in variants of the invention.

Furthermore, in the set of symbols ENS1, the symbols are all different and each of these symbols comprises two possible representations. The relative position of the elements of the differential pair is here unchanged for the two representations of a differential pair. Between two representations, the parameter values of the elements may change, or else the elements may be reversed, but their positioning in the differential pair and in the symbol will remain the same.

Thus, the symbol A comprises a differential pair of elements E1 and E2 positioned in a vertical arrangement in the two representations A1 and A2. In the first representation A1 of the symbol A, the element E1 which is a cross-ruled spot, is positioned above the element E2, which is a shaded spot. In the second representation A2, it is the element E2 which is above the element E1. Thus, the symbol A comprises a differential pair of elements positioned vertically and two representations in which the elements E1 and E2 have been reversed.

The symbol B also comprises a differential pair of elements E1 and E2, but positioned horizontally. In a first representation B1, the element E1 is to the left of the element E2, in a second representation B2, the element E1 is to the right of the element E2.

The symbol C comprises a differential pair of elements E1 and E2 positioned in a first diagonal direction. In a first representation C1, the element E1 is positioned above and to the left of the element E2, and in a second representation C2, the element E1 is positioned below and to the right of the element E2.

Finally, the symbol D comprises a differential pair of elements E1 and E2 positioned in a second diagonal direction opposite to said first diagonal direction of the symbol C. In a first representation D1, the element E1 is positioned above and to the right of the element E2, and in a second representation D2, the element E1 is positioned below and to the left of the element E2.

The four symbols A, B, C and D thus defined each with two representations define the set ENS1 with which the reference pattern P1 is created (S1).

It will be noted that the two representations of each symbol of the set ENS1 may define a bit of a binary value. As an example, the representations A1, B1, C1 and D1 correspond to the value 1, and the representations A2, B2, C2 and D2 correspond to the value 0.

The arrangement of symbols forming the reference pattern P1 may be created by arranging symbols of the set ENS1, without defining the representation of these symbols. In the example illustrated, the symbols are arranged in a rectangular area in which the space is used so as to include a maximum number of symbols in this area. The symbols are, for examples, nested one inside the other and the elements of these symbols are aligned vertically and horizontally within the arrangement P1. It will be understood that, in the arrangement of symbols forming the reference pattern P1, the symbols could be arranged in an area with a different geometrical shape, for example square, circular, elliptical, triangular or other.

In the example illustrated, a symbol A is positioned at the top right of the arrangement P1, an element of this symbol is positioned at the intersection of a horizontal axis X-X and of a vertical axis Z-Z, and an element is positioned at the intersection of a horizontal axis Y-Y, offset by approximately the dimension of an element E1 or E2 relative to the horizontal axis X-X and the vertical axis Z-Z. A symbol B may be positioned under this symbol A by aligning a right-hand element of this symbol B with the axis Z-Z. It is also possible to position a symbol B to the right of the symbol A whose two elements are then aligned with the axis X-X.

The reference pattern P1 comprises, in the example illustrated, 32 symbols of the set of symbols ENS1. Since each of these symbols has two representations, it is possible to create, in this example, $2^{32} = 4\ 294\ 967\ 296$ different reference patterns P1. Furthermore, by associating a bit with each symbol, $2^{32}$ binary values can be coded by means of this arrangement of symbols P1.

It will be noted that, by increasing the number of symbols of the reference pattern P1, the number of possible representations of the same pattern and the number of numerical values which can be coded by means of this pattern are increased. Generally, for a set of symbols each comprising a differential pair and having two representations, it will be possible to obtain, for a "pattern" having n symbols, $2^n$ different representations and values.

In order to use the "pattern" to coder a numerical value, it is necessary to assign a reading order to the symbols which make up the "pattern".

Thus, for a binary value comprising 32 bits, the so-called most significant bit (MSB) may be assigned to the symbol MSB1 of the pattern P1, here a symbol A positioned top left of the "pattern" P1. The so-called least significant bit (LSB) may be assigned to the symbol LSB1, here a symbol A arranged bottom right of the "pattern" P1. The order in which the other bits are assigned may be, for example, from left to right and from top to bottom of the "pattern" P1. According to one aspect, it is also possible to assign a random order of the bits in which the successive bits are not adjacent.

An operation denoted S2 in the figure is used to create a pattern for coding numerical information comprising symbols belonging to the set ENS1 and arranged according to the reference pattern P1. Two possible examples of patterns M1 and M2 obtained by the operation S2 are represented. The patterns M1 and M2 correspond to two different numerical values. Obviously, the number of patterns Mn that it is possible to obtain by the operation S2 is not limited.

In the example illustrated, the most significant bit MSB1 of the value coded in the pattern M1 is equal to that of the value coded in the pattern M2 and here corresponds to a representation A1: 1. The second bit of these values, corresponding to the symbol SB2, a symbol B, is represented in the representation B1 within the pattern M1, and in the representation B2 within the pattern M2. Thus, the second bit of the value coded in the pattern M1 corresponds to a 1 and in the pattern M2 to a 0. Other symbols are represented in different representations for the two patterns M1 and M2, for example the symbols SB3 and SB4. The same may also apply for all the symbols of the different coding patterns obtained by the operation S2.

Figure 2:
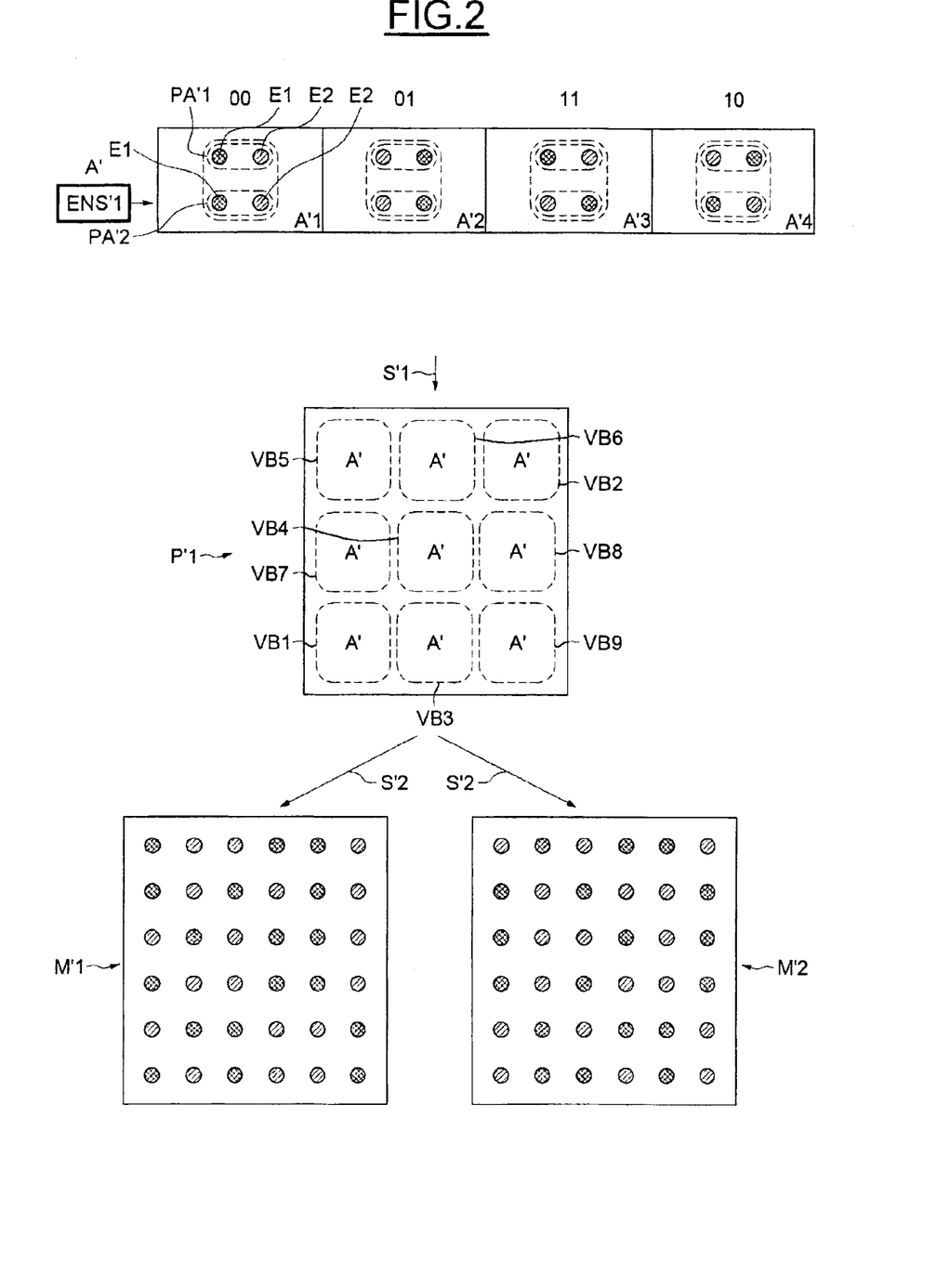

FIG. 2 schematically shows another implementation of a creation S'1 of an arrangement of symbols or reference pattern P'1. In this example, the set of symbols ENS'1 comprises only a single symbol, but it could also comprise a number of different symbols.

The set of symbols ENS'1 here comprises a single symbol A' comprising two differential pairs of elements. The symbol A' comprises two differential pairs whose elements are aligned horizontally and the differential pairs are positioned vertically.

The use of two differential pairs makes it possible notably to define four representations. A representation A'1 is obtained in which a differential pair PA'1 is positioned above a differential pair PA'2. In the representation A'1, the differential pair PA'1 and the differential pair PA'2 both comprise an element E1 to the right, an element E2 to the left. By modifying the respective positions of the elements E1 and E2 within the differential pairs PA'1 and PA'2 in the representations A'2, A'3 and A'4, the other representations of the symbol A' are obtained.

It will be noted that a reversal of the positioning of the elements of one of the differential pairs in a representation makes it possible to obtain another representation of the symbol A' of the set ENS'1.

It will be noted that binary values can be assigned to these representations. For example, the value 00 to the representation A'1, the value 01 to the representation A'2, the value 11 to the representation A'3 and the value 10 to the representation A'4.

In this example, the set ENS'1 comprises only one symbol. Obviously, in practice, it will be possible to provide a greater number of symbols similar to the symbol A' and having one or more differential pairs that can be arranged in different ways.

In the operation S'1, it is possible to arrange a number of symbols A' to form a reference pattern P'1. This "pattern" comprises, in the example illustrated, 9 symbols, each capable of coding two bits. It is therefore possible to code $2^{2\times9}=262\,144$ different values. These values can be coded by using the following order of the symbols: VB1 (most significant), VB2, VB3, VB4, VB5, VB6, VB7, VB8 then VB9 (least significant).

In the example illustrated, in the operation S'2, two patterns M'1 and M'2 have been created, in which two different numerical values are coded.

More specifically, the binary value 10 00 00 01 00 10 10 00 01=132 257 has been coded in the pattern M'1 by following the order VB1 to VB9 and by using binary values defined above for the representations A'1, A'2, A'3, A'4. In the pattern M'2, the binary value 01 11 10 10 10 10 00 01 00=125572 has been coded. Obviously, conventionally, it is possible to obtain characters by means of these binary values, for example by using the ASCII code system, well known to those skilled in the art.

Figure 3:
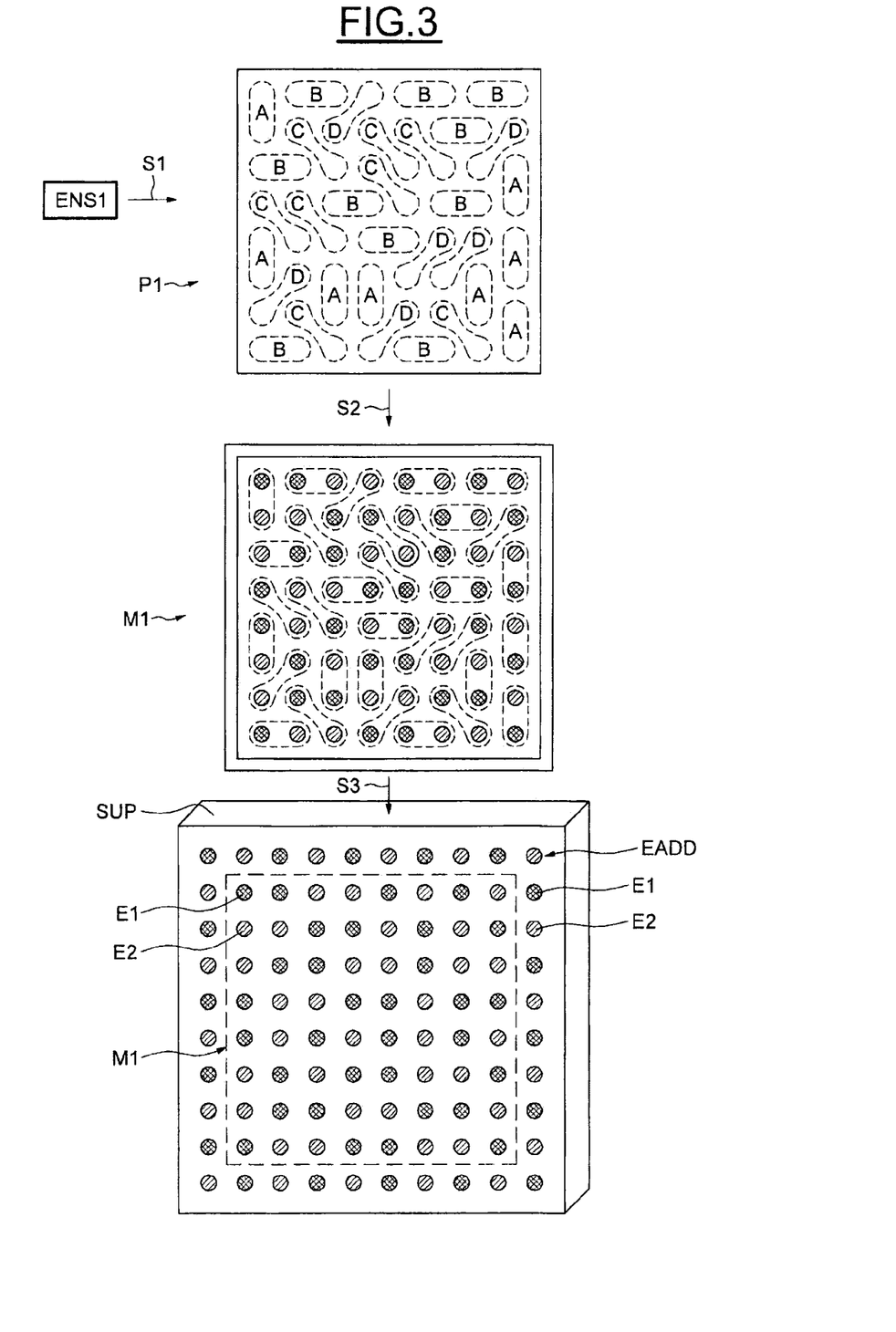

FIG. 3 schematically shows an implementation of a method for marking an article or security device SUP using two patterns M1 and M2 as illustrated in FIG. 1, in which two different numerical information items are coded.

This method comprises the step S1 for creation of an arrangement of symbols or "pattern" P1 by means of a set of symbols ENS1. The operation S2 is then implemented in order to obtain a pattern M1 in which a numerical information item is coded by means of the "pattern" P1 comprising 32 symbols. Reference can be made to the description above concerning FIG. 1 for more details concerning the operations S1 and S2. The pattern M1 and any other pattern also created by the operation S2 can then be stored on a computing device.

The step S3 comprises a marking of the stored pattern M1, on an article or security device SUP. The expression "marking" can be understood to mean a printing, for example with visible or invisible ink, an etching, a deposition, a stamping, a calendaring, an application of a laser beam or any other operation making it possible to position the coding pattern M1 and any other coding pattern on the article or the security device. The article or security device SUP may be a label, a package, a cartridge, a container containing foodstuffs, nutraceutical products, pharmaceutical products or drinks, a bank slip, a credit card, a stamp, a revenue stamp, a tamper indicator, a secure document, a passport, an identity card, a driving license, an access card, a transport ticket, an admission ticket, a coupon, a printing form, a reflecting film, aluminium paper, a commercial article or, generally, an article or device that is to be furnished with a means of identification or coded data that is difficult to identify without appropriate equipment.

The marking step S3 notably corresponds to a marking of the elements, E1 and E2 in the example illustrated, of the differential pairs of the symbols A, B, C, D. It will be noted that the article or security device SUP has, on its outer surface or its package, a scattering of elements similar to those of the coding pattern M1 but not as a whole forming a coding pattern. There is no marking intended to form an identifier on the article, only the elements of the differential pairs of the reference pattern M1 being marked on the article actually within the scattering of abovementioned undifferentiated elements. Thus, unlike the data matrices used in the prior art, all the marked elements correspond to a coded value information item in a coding pattern. By using a fine resolution, for example of the order of several hundreds of elements per inch (Dots Per Inch, DPI), for example between 150 and 600 DPI or preferably between 300 and 600 DPI, it is possible to mark patterns according to the invention that will not be detectable by a user but that only appropriate equipment comprising an electronic reading system will be able to detect and interpret. Such a resolution also makes it possible to mark a plurality of small patterns: the marking of the information is thus particularly robust because an alteration of one or even several patterns will not render all patterns illegible. The use of such a fine resolution also makes it possible to prevent the reproduction of a pattern, for example by means of a photocopier.

In order to make a pattern according to the invention undetectable to the naked eye, it is also possible to mark patterns with parameter values that are similar (notably the values of the elements of a differential pair). More specifically, it is possible to choose parameter values that a human eye cannot discern but that an appliance can detect. It is also possible to use a coarse resolution, for example wider than 150 DPI, without in any way enabling a user to discern different elements that make up a pattern. Obviously, the pattern as a whole, or a plurality of adjacent patterns, may be visible to a user, who will see only a uniform area, for example uniformly coloured.

It will be noted that the pattern M1 can be marked within a graphic element of the article or security device SUP, this graphic element possibly being an image or a logo, or a coded representation of another numerical information item, for example of one-dimensional, two-dimensional or three-dimensional barcodes, of scatter plots, of networks of lines or of data matrices.

As a nonlimiting example, it is possible to mark patterns according to the invention in the bars of a barcode.

In the example illustrated, simultaneously with the marking step S3, a certain number of other additional elements EADD of type E1 or E2 were marked outside the pattern M1. In the example illustrated, the additional elements EADD form a row surrounding the pattern M1. The additional elements are here aligned with the elements of the pattern M1, which is a way of making it difficult to read the coding pattern M1. The additional elements may also be more numerous, in numbers very much greater than the number of elements that form the coding pattern M1, and have different positionings.

These additional elements EADD may form part, for example, of a graphic area of the security article or of the security device. The additional elements EADD may also serve to embed the coding pattern M1 to make it all the more difficult to detect. Since these additional elements are not arranged in the form of differential pairs in a reference pattern, they will not falsify the reading of the numerical information coded in the coding pattern M1. It will also be understood that these additional elements EADD may preexist on the article, in which case there is no need to proceed with their marking during the step S3.

In all cases, it may be advantageous to choose a representation of the elements E1 and E2 which approximates as closely as possible the representation of the additional elements EADD so as to make the detection and the reading of the coding pattern M1 more difficult.

It will be noted that a number of means can be used to make the marked pattern all the more undetectable to the naked eye. For example, it is possible to use an ink whose chemical nature makes it invisible to the naked eye but simply visible under specific lighting, for example using infrared or ultraviolet light. The composition of these inks may comprise one or more pigments and/or dyes which absorb in the visible or invisible of the electromagnetic spectrum and/or may comprise one or more pigments and/or dyes that are luminescent. Nonlimiting examples of appropriate pigments and/or of dyes that absorb in the visible or invisible of the electromagnetic spectrum include, by way of nonlimiting example, the derivatives of phthalocyanine but also the derivatives of perrylene, quaterylene type, substituted or not. Nonlimiting examples of appropriate luminescent pigments and/or dyes comprise the derivatives of lanthanides. The presence of pigment(s) and/or of dye(s) makes it possible to enhance and strengthen the security of the marking against counterfeiting. Some compounds mentioned above make it possible to confer traceability and/or authentication properties on the marking according to the invention. In fact, these particular compounds differ from the conventional inks and their detection, for example by chemical or physical analysis means, may make it possible to determine the origin of the marked product.

It is also possible to mix the marked coding pattern or patterns with a noise, for example by incorporating the coding pattern in an environment of the surface of the article or security device SUP including irregularities or preexisting spots. These irregularities or these spots should preferably have a size and an appearance that are comparable to the size and the appearance of the marked coding patterns.

The coding pattern M1 marked on the article or security device SUP, and any other additional coding pattern created in a similar way, may make it possible to code an information item enabling the security article or the security device SUP to be authenticated or even an information item relating to the use of the security article or of the security device SUP.

It will be noted that using a set of symbols each comprising similar elements, and a reference pattern comprising a high number of symbols makes it possible to obtain a marking that has a uniform appearance, in which it is not possible to read the coded information without knowing the symbols, the representations of the symbols and the reference pattern used. Moreover, the use of differential pairs comprising two element having two possible parameter values such as the elements E1 and E2 illustrated here by way of example, makes it possible to obtain a pattern comprising as many elements E1 as elements E2, and therefore, a uniform appearance of the outer surface of the article or of the security device.

It is possible to mark a number of coding patterns according to the invention on the article or security element SUP. It is possible to mark a number of identical patterns and also a number of different patterns. It is also possible to cover a surface of the article or security element SUP.

As a nonlimiting example, it is possible to mark coding patterns according to the invention over the entire surface of a package, intended to cover an object. The reading of the coding patterns can then be implemented on the basis of any surface portion of the package covering the object. It will be possible for example to mark substantially transparent plastic films, or also opaque films of aluminium foil type. It will also be possible, using appropriate marking means, to mark coding patterns according to the invention on very rough or non-uniform surfaces, for example wine bottle stoppers or even on the corresponding seal.

Moreover, certain articles that are marketed, for aesthetic reasons or constraints associated with their production, have little space available to support a marking. The marking according to the invention makes it possible to overcome these constraints. In practice, the pattern or patterns can be marked on supports having a reduced surface while remaining invisible to the naked eye, while retaining the reading robustness according to a method of the invention.

Figure 4:
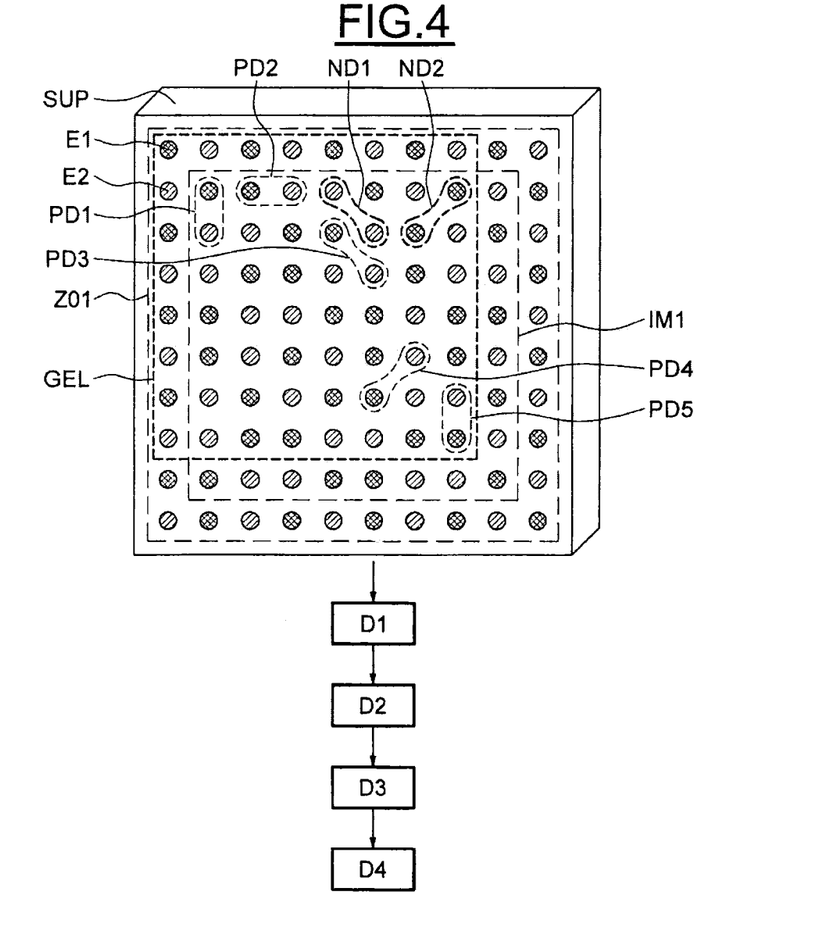

FIG. 4 shows an implementation of a method for reading numerical information coded in a coding pattern according to the invention, marked on a surface of an article or security device SUP.

Before the reading is implemented, a set of symbols, for example the set ENS1 already mentioned by way of example with reference to FIG. 1 or the set ENS'1 already mentioned by way of example with reference to FIG. 2, and one or more arrangements of symbols or reference patterns, are stored in a memory of a reading system.

Then, in the example illustrated, the method comprises a step D1 in which an image of an area ZO1 of a surface of an article SUP is captured. The system suitable for implementing the step D1 may comprise a reading device such as a fixed or portable reader or scanner, a camera, a telephone equipped with a digital camera, a tablet equipped with a digital camera, and, generally, any means suitable for making the marked elements visible, for example lamps radiating in the infrared or ultraviolet ranges. The image obtained is then stored.

An element identification step D2 is then implemented. It will notably be possible to identify the elements according to the knowledge of the symbols of a set of symbols, for example the set ENS1. For symbols whose elements are spots of varying shapes (for example, the symbols of the set ENS1 illustrated in FIG. 1), a plurality of elements, for example of type E1, E2, are detected within the image obtained in the step D1. Furthermore, it is possible to measure, for each element, a parameter value and store the measured values.

Then, in the step D3, the symbols can be identified by means of a stored reference pattern, for example the arrangement of symbols P1 illustrated in FIG. 1. Since the area ZO1 may include additional elements, for example additional elements EADD, the identification of the symbols may comprise a number of steps up to the identification of the symbols of the coding pattern or patterns by means of the single reference pattern stored.

There now follows a description of a simplified example of implementation of this identification with reference to the example of FIG. 1, it being understood that the procedure would be similar in the case of the example of FIG. 2. We can begin by matching the arrangement of symbols P1 with a first group of elements GEL through a study window of the reading device which comprises this group of elements GEL (comprising a group of 64 elements positioned in a grid). By matching the arrangement of symbols P1, that is to say the stored reference pattern, with the group of elements GEL, it will be noted that a certain number of pairs of symbols of the group GEL corresponding to the arrangement of symbols P1 are not differential pairs. The pairs ND1 and ND2 comprise pairs of elements arranged as two pairs of symbols of the arrangement P1, but these pairs are not differential pairs. In practice, they respectively comprise two elements E2 and two elements E1. In both cases, there is no parameter difference between the two elements. It will be noted that two different elements do not always form a differential pair. It is in particular a good idea to measure the difference between the two parameter values of the two elements, to compare it to a threshold, or to measure the difference between each parameter value and an average value.

The study window of the reading device may have a size at least equal to that of a marked coding pattern. The study window may notably have dimensions (width and height) which are twice those of a marked coding pattern.

It is therefore possible to use the parameter values obtained in the step D2 to determine whether the pairs of elements are differential pairs. It will also be possible to compare the difference between the values to a stored threshold, or even to check whether the values of each parameter are respectively greater than or less than another value, for example an average value. This average value may be stored previously or be measured and calculated in the step D1 or in the step D2 by observing the surface of the article.

The non-differential pairs ND1 and ND2 obtained by matching the arrangement of symbols P1 with the group of elements GEL shows that the elements of the group of elements GEL do not form a coding pattern comprising symbols arranged according to the arrangement or reference pattern P1.

The reading device or the study window is then displaced relative to the article to match the reference pattern P1 with another group of elements, for example the group of elements IM1 (FIG. 4). All the elements of the group IM1 correspond to differential pairs of elements of symbols arranged according to the reference pattern P1. It will be noted for example that the differential pair PD1 corresponds to the symbol corresponding to the most significant bit MSB1, the differential pair PD2 corresponds to the symbol SB2, the differential pair PD3 corresponds to the symbol SB3, the differential pair PD4 corresponds to the symbol SB4 and the differential pair PD5 corresponds to the symbol corresponding to the least significant bit LSB1.

It is then estimated that the coding pattern has been found within the group of elements IM1. It will be noted that, by browsing over the groups of elements marked on the article or the security device SUP and by matching the reference pattern P1 with groups of elements, a representation of a coding pattern coding a numerical information item has been found, and without using any coordinate system indicating the placement of the coding pattern on the article.

It will be noted that it is possible not to require the recognition of all the symbols of the reference pattern P1. It is possible in this case to calculate the number of symbols identified, and compare this calculated number to a probability threshold. If the calculated number is greater than this threshold, it can be estimated that a coding pattern produced by means of a reference pattern according to the invention is present. The pattern is thus very robust, an alteration of symbols of a pattern not preventing the recognition of the reference pattern and reading of the symbols which have not been damaged.

As a nonlimiting example, for a reference pattern comprising 128 symbols, a probability threshold can be taken that is of the order of 30 symbols identified out of 128, that is to say 24%. Other probability thresholds can be used, it is possible in particular to choose a high threshold in order to determine with certainty that the coding pattern is identified.

Finally, once the symbols have been identified as indicated previously, the information coded by the marked elements forming a coding pattern can be read in a step D4. This reading can be done only with a knowledge of the order of reading of the arrangement of symbols. The order defined hereinabove can be used, in which the reading is conducted from top to bottom and from left to right. The knowledge of the set of symbols and of their respective representations makes it possible to detect the binary values associated with the marked symbols. The parameter values measured in the step D2 are used to determine the representation used. The reading of the binary value of each symbol makes it possible to determine the binary value coded in the marked coding pattern.

The step D4 may also comprise conventional error correction steps in order to determine the representations of the symbols that have not been identified.

Furthermore, in the implementation of the reading method, a margin of displacement in height and in width can be tolerated for each marked element. As a nonlimiting example, slight diameter differences in the elements do not affect the reading. Nor do slight positional differences affect the reading.

Figure 5:
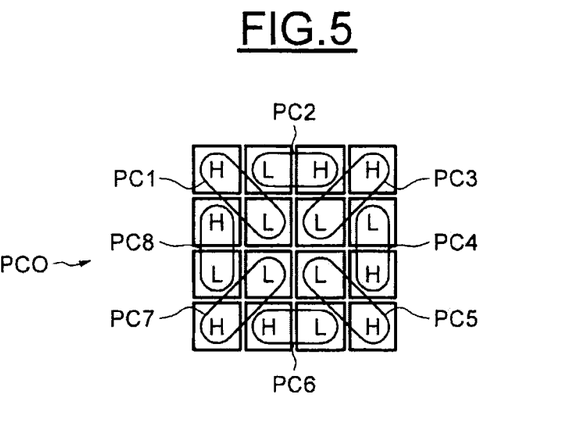
Figure 6:
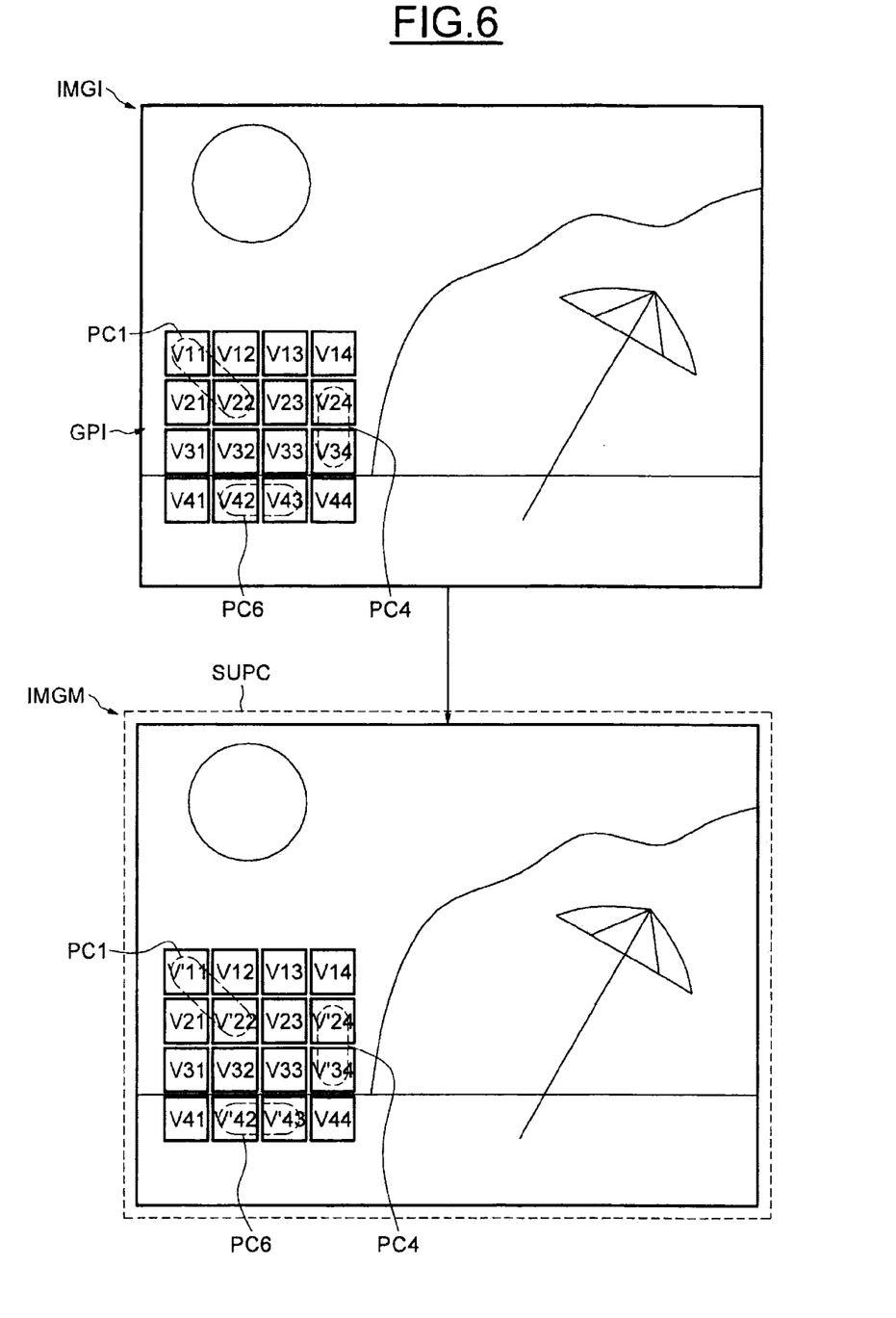
FIG. 6 illustrates another implementation and embodiment according to the invention.

There now follows a more detailed description, referring more particularly to FIGS. 5 and 6, of a variant of the invention.

FIG. 5 shows a coding pattern PCO in which an information item is coded according to an arrangement of eight symbols in which the elements of the symbols are differential pairs of image pixels. The eight symbols are arranged in a matrix of 4×4 pixels. Each pixel is characterized by a parameter which may be the one of the colorimetric components. The symbols of this pattern PCO thus each comprise differential pairs of elements similar to the symbols of the set ENS1 of FIG. 1, but in which the elements are pixels.

Furthermore, the pairs of pixels are differential pairs whose representation is defined by the values of a colorimetric component, for example the hue, the saturation or the lightness, of each of the pixels of the differential pair. More specifically, one of the pixels of the differential pair has a high value denoted H and the other has a low value denoted L. By reversing the respective position of these levels, different numerical information can be coded.

The coding pattern PCO is intended to be included in an image, as illustrated in FIG. 6. In this figure, an initial image IMGI is represented which conventionally comprises a plurality of pixels and a group of 16 pixels GPI forming a 4×4 matrix of pixels. It is within the group of pixels GPI that the coding pattern PCO will be included. The initial image IMGI may be a digital image, stored in a memory and modifiable by processing means, for example equipped with a microprocessor and/or logic circuits. Once modified to include the coding pattern PCO, this image may be marked on a surface of a security article or element.

Each pixel of the group of pixels GPI has a value of a chosen colorimetric component denoted VIJ, I ranging from 1 to 4 indicating the column of the pixel in the 4×4 matrix, and J ranging from 1 to 4 indicating the row of the pixel in the 4×4 matrix. It is then possible to check whether each pair of pixels in the group of pixels GPI corresponds to a differential pair according to the pattern PCO.

By comparing the value of the pixels V11 and V22 of the pair of pixels PC1, if V11 is greater than V22 and if the difference between the two values is less than a threshold, in the group of pixels GPI, then it is necessary to modify the value of the colorimetric component of these pixels, for example by increasing V11 and by reducing V22 by the same value to obtain the modified pixels V'11 and V'22 of the modified image IMGM.

The increase and the reduction by the same value is particularly advantageous; thus, the average value of the parameter within the pair PC1 is the same for the values V11 and V22 and for the values V'11 and V'22.

Other pairs of pixels can thus be modified. For example, the pixels of the pair PC4 can have values V24 and V34 but V24 may be greater than V34. In other words, V24 corresponds to a high value and V34 to a low value. In order to mark the pair PC4 of the pattern PCO, the values of the pixels can be reversed, and the values V'24 and V'34 are obtained. It is also possible to reverse, increase and reduce as above, the values of the pixels, for example the values of the pixels of the pair PC6, to obtain the values V'42 and V'43.

The values of the pixels of the remaining pairs of the group of pixels GPI have not been modified, because the values of the pixels of the initial image may also already correspond to differential pairs of the coding pattern PCO.

Thus, within the modified image IMGM (here marked on an article or security device SUPC), the pattern PCO has been marked by modifying the values of pixels of the initial image IMGI. The modifications of pixel values are imperceptible to a user, since they are applied at neighbouring pixels in images that may comprise millions of pixels.

It will be noted that it is also possible to use other colorimetric components, for example components of the Red-Green-Blue system.

Moreover, in order to determine whether, in a pair of pixels, one has a high value and the other has a low value, it is possible to compare these values to an average value obtained by a calculation of the value of the component for a number of neighbouring pixels. It is also possible to calculate an average value relating to another component. As a nonlimiting example, the red level of the neighbouring pixels of a differential pair may define the average value or a threshold to which the values of the pair are compared.

There is also proposed a system suitable for implementing a marking method, for example the method of FIG. 3. In one embodiment, this system may comprise a memory configured to store a set of symbols, an arrangement of these symbols forming a reference pattern, and numerical information to be coded. The system may comprise means for marking on a surface of an article or a security device, for example means for printing, etching, stamping, calendaring, deposition, application of a laser beam or any other method making it possible to modify portions of the surface concerned. These marking means can make it possible to mark elements invisible to the naked eye.

There is also proposed a system suitable for implementing a reading method, for example the method of FIG. 4. This system may comprise means for storing an arrangement of symbols forming a reference pattern and a set of symbols, and means suitable for capturing an image such as a camera, a fixed or portable reader or scanner, a portable telephone equipped with a camera, a tablet equipped with a camera, means for revealing the marked elements such as a lamp radiating in the ultraviolet or in the infrared, and processing means suitable for identifying the elements and the symbols on the basis of the captured image comprising, for example, a microprocessor and/or logic circuits.

It will be noted that, according to one aspect, the coding patterns obtained may be used to authenticate an article, and thus enhance its traceability and detect counterfeit articles. It is also possible to mark information relating to the use of the article.

A marking of coding patterns according to the invention has a particularly high robustness. It will be possible to mark patterns by using a fine resolution, for example 300 DPI, so as to obtain patterns that individually have a size less than a square millimeter, in order, finally, to cover a surface for example of the order of one or more square centimeters. Obviously, other resolutions and dimensions are possible.

As a nonlimiting example, such coding patterns according to the invention can be marked on a surface of the order of a square centimeter. These patterns may be visible overall or invisible for a user. The entire marked surface may have dimensions that are, for example, similar to a data matrix. In the case where the patterns are visible, they may have a uniform appearance for a user, or equally be embedded in an image.

Any alteration of the marked surface will not prevent the detection of the reference pattern used, nor the reading of the numerical information coded in the patterns. The surface may, for example, have been altered by means of a pen or a pencil, it may have been creased, folded, scratched or torn. Such alterations may have been combined without preventing the reading of the numerical information coded in the patterns.

By contrast, such alteration processes applied to conventional markings of barcode or data matrix type would make the reading of the information contained in these markings totally impossible.

The invention claimed is:

1. Pattern for coding a numerical information item on a surface, comprising a specific arrangement of a plurality of symbols belonging to a set of symbols, each symbol in the arrangement being intended for the coding of a portion of said numerical information item, wherein each symbol consists of at least one differential pair of elements positioned in a specific way, each element including a parameter, the parameter of the first element of each differential pair having a first value and the parameter of the second element of each differential pair having a second value different from the first value, and said specific arrangement corresponds to a predetermined arrangement of said symbols constituting a reference pattern.

2. Pattern according to claim 1, in which the symbols of the set of symbols are all different.

3. Pattern according to claim 1, in which the symbols of the set of symbols are all identical.

4. Pattern according to claim 1, in which the values of the parameters of the two elements of a differential pair are respectively greater than and less than a first reference value and/or the difference between the two values is greater than a second reference value.

5. Pattern according to claim 4, in which the difference between the values of the parameters of the two elements of a differential pair is greater than or lower than a threshold.

6. Pattern according to claim 4, in which the values of the parameters of the two elements of a differential pair of elements are respectively greater than and less than the average value of said parameter within differential pairs neighbouring said differential pair.

7. Pattern according to claim 1, in which each symbol of the set of symbols has at least one first representation and one second representation different from the first representation, the values of the parameters of the elements of at least one differential pair of the symbol both being different between the first representation and the second representation.

8. Pattern according to claim 7, in which the positioning of the first element and of the second element of a differential pair of elements in a representation of a symbol is the reverse of the positioning of the first element and of the second element of the same differential pair of the same symbol in another representation.

9. Security article or device comprising at least one pattern according to claim 1.

10. Article or security device according to claim 9, comprising a number of identical and/or different patterns.

11. Article or security device according to claim 9, comprising at least one pattern marked within an image or a logo, or a coded representation of another numerical information item chosen from the group formed by one-dimensional, two-dimensional or three-dimensional barcodes, scatterplots, networks of lines, data matrices.

12. Method for marking a pattern for coding a numerical information item on a surface, characterized in that it comprises the following steps:
a specific arrangement or reference pattern is defined for a plurality of symbols belonging to a set of symbols, each symbol in the arrangement being intended for the coding of a portion of numerical information, each symbol consisting of at least one differential pair of elements positioned in a specific way,
a pattern for coding said numerical information item is created by means of the specific arrangement or reference pattern of a plurality of symbols, by giving to each symbol a specific representation so that each symbol consists of at least one differential pair of elements, each element being characterized by a parameter, the parameter of the first element of each differential pair having a first value and the parameter of the second element of each differential pair having a second value different from the first value,
a surface is provided,
a plurality of elements is marked on said surface, the elements each being characterized by said parameter,
the step for marking the plurality of elements is carried out in such a way that certain marked elements form the numerical information item coding pattern.

13. Method for reading a numerical information item coded in a coding pattern marked on a surface comprising marked elements each characterized by a parameter, the method being characterized in that it comprises the following successive steps:
a specific arrangement or reference pattern of a plurality of symbols belonging to a set of symbols is stored, each symbol in the arrangement being intended for the coding of a portion of said numerical information, each symbol consisting of at least one differential pair of elements positioned in a specific way, the parameter of the first element of each differential pair having a first value and the parameter of the second element of each differential pair having a second value different from the first value,
a) an image of the elements of an area of said surface containing at least part of said pattern a group of marked elements is captured through a study window of a reading device,
b) the elements forming said pattern are identified by means of said stored arrangement,
said symbols of the pattern are identified by means of said stored arrangement,
c) said stored reference pattern is associated with said group of marked elements,
d) a difference between the values of the parameters of pairs of elements of the symbols of the group of marked elements is measured in order to determine if they constitute differential pairs,
e) if not, the study window is shifted with respect to the surface comprising marked elements and an image of another area of said surface containing another group of marked elements is captured,
f) steps c) and d) are repeated until a predetermined number of elements of the group of marked elements match with differential pairs arranged according to the stored reference pattern, and
g) then, digital data encoded with the elements of the marked coding pattern retrieved among a group of marked elements is read.

14. Method according to claim 13, in which the number of symbols identified is calculated and the result of the calculation is compared to a probability threshold.

15. Method according to claim 13, in which the identification of the symbols also comprises a comparison of the value of the parameters of two marked elements of a differential pair to a first reference value and/or a comparison of the difference between the two values and a reference value.

16. Method according to claim 15, in which the identification of the symbols also comprises a comparison to a threshold of the difference between the values of the parameters of the two elements of a differential pair.

* * * * *